June 23, 1953
C. O. LUND
2,642,820
METHOD OF MAKING CAKE CENTER FROZEN
CONFECTIONS IN TWIN MOLDS
Filed March 5, 1949
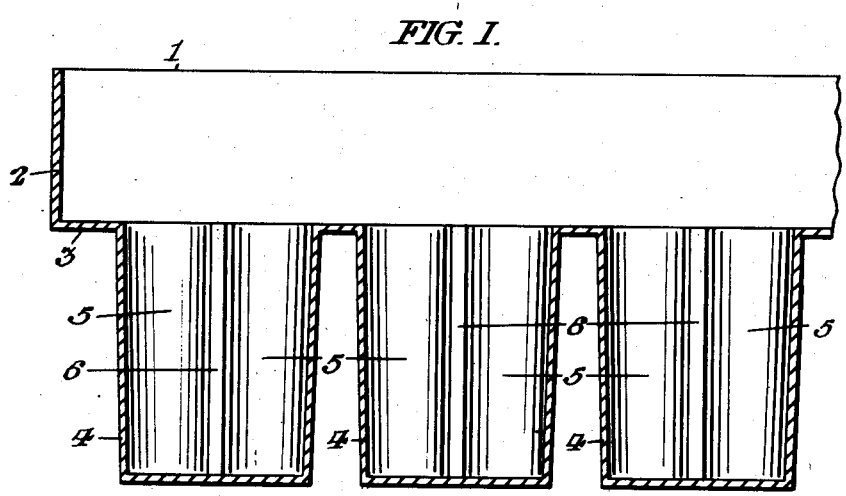
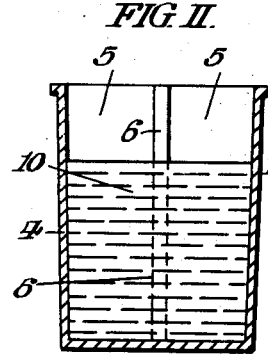
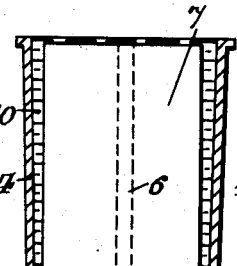
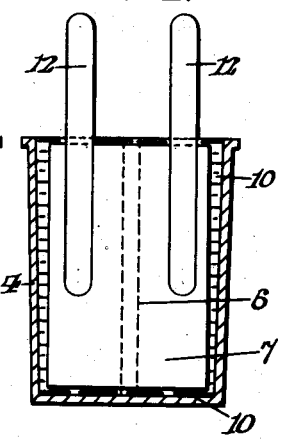
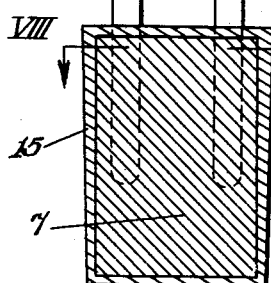
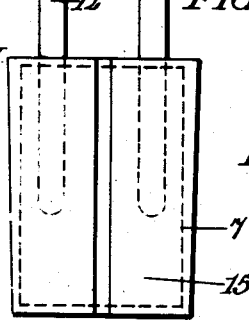
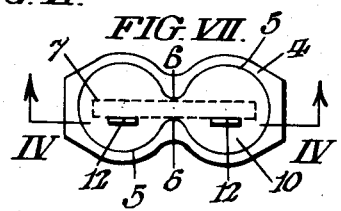
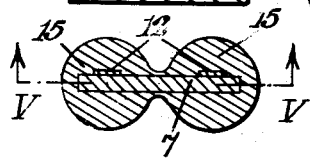
INVENTOR.
CLINTON O. LUND,
BY
ATTORNEY Patented June 23, 1953

2,642,820

UNITED STATES PATENT OFFICE 2,642,820

METHOD OF MAKING CAKE CENTER FROZEN CONFECTIONS IN TWIN MOLDS

Clinton O. Lund, Chicago, Ill., assignor to Maun and Lund, Inc., Chicago, Ill., a corporation of Illinois Application March 5, 1949, Serial No. 79,788

6 Claims. (Cl. 107—54)

My invention relates to a cake center twin frozen confection which may be made in what is known in the trade as a "twin mold," and to the process of making the cake center twin frozen confection in a twin mold.

Ice cream, water ice, etc. when frozen on a stick, or handle, imbedded in a frozen edible substance, is known in the trade generally as a "frozen stick confection." When composed of ice cream, the frozen stick confection is known in the trade as an "ice cream piece"; when composed of ice cream and cake, such as a graham wafer, chocolate wafer, etc., the frozen stick confection is known in the trade as a "cake piece"; when composed of water ice, the frozen stick confection is known in the trade as a "water ice piece"; etc.

Frozen stick confections are made in molds which are provided with a multiplicity of individual mold pockets of the same volumetric capacity, say, three ounces, or three and one-half ounces, or four ounces, etc. Frozen stick confections are of various types, such as a single piece made in what are known in the trade as single molds. Another type of frozen stick confection is what is known in the trade as a "twin piece," which is a piece which has the general appearance of two cylinders, or polygonal-sided figures of similar appearance, joined by a connecting web to form a unitary piece which may be broken readily in two, if desired.

Experience has demonstrated that the buying public has well established seasonal preferences for the various types of frozen confections made of different edible substances. For example, the substantial demand by the buying public for water ice pieces exists during the months of the year which are hot or fairly warm, with the demand for water ice pieces increasing as the temperature rises. In cooler and cold weather, the demand of the buying public is for ice cream pieces, with some preference for ice cream pieces which include a cake center.

Heretofore, twin molds have been used almost exclusively for the production of pieces composed of water ice of some particular flavor. Prior to my invention, frozen stick confection manufacturers were of the belief that it was impossible to use twin molds in the manufacture of a cake center twin frozen confection composed of ice cream of some particular flavor. Accordingly, the substantial investment of a frozen stick confection manufacturer in twin molds has been practically non-productive for the fall, winter and early spring months.

One feature of my invention is that my improved cake center twin frozen confection may be made by a process involving the use of twin molds heretofore used primarily during the summer months for the production of water ice pieces.

Another feature of my invention is that my improved cake center twin frozen confection may be made in ordinary twin molds without the use of any additional equipment than that needed for the production of twin water ice pieces.

Another feature of my invention is that the cake center of my improved twin frozen confection remains crisp and fresh under prolonged refrigeration, either in the hardening room of the manufacturer or in the dispensing cabinets of a dealer.

Another feature of my invention is that breakage of the cake portion of my improved frozen confection is reduced to a minimum during the necessary handling of the pieces.

Another feature of my invention is that my improved cake center twin frozen confection may be made by workers of no greater skill than required in the production of pieces composed of water ice of some particular flavor.

Another feature of my invention is that my improved cake twin frozen confection is economical to manufacture because the cake portion comprises roughly about one-third of the volume of the finished piece and, of course, the cost of the cake center is considerably less than the volume of ice cream which the cake center displaces.

The accompanying drawings show somewhat diagrammatically the progressive steps of the process of making my improved cake center twin frozen confection in an ordinary twin mold.

In said drawings,

Fig. I is a somewhat diagrammatic longitudinal sectional view of an ordinary well-known type of frozen stick confection twin mold which is provided with a multiplicity of individual twin mold pockets. Such twin molds usually may include, for example, four rows of six individual twin mold pockets, or twenty-four individual twin mold pockets per twin mold.

Fig. II is a sectional view of a single one of the twin mold pockets after the individual pocket has been filled with, say, ice cream of some particular flavor, to slightly more than two-thirds of its volumetric capacity, but with the ice cream mix in an unfrozen liquid state within the mold.

Fig. III is a sectional view of the twin mold pocket shown in Fig. II after the cake center has been inserted in the twin mold pocket, and with the ice cream mix in an unfrozen liquid state.

Fig. IV is a sectional view, taken on the line IV—IV in Fig. VII, of a single twin mold pocket with the sticks, or handles, inserted in the ice cream mix, which is in an unfrozen liquid state, and with the sticks in contact with the cake center.

Fig. V is a sectional view, taken on the line V—V in Fig. VIII, of a cake center twin frozen confection as removed from the individual twin mold pocket after the piece has been completely frozen by immersion of the twin mold in a brine tank.

Fig. VI is a vertical elevation of the twin piece shown in Fig. V.

Fig. VII is a top plan view of the twin mold pocket shown in Fig. IV.

Fig. VIII is a horizontal sectional view of the completely frozen piece shown in Fig. V, taken on the line VIII—VIII in Fig. V.

Referring to said drawings; the twin mold 1 indicated in Fig. I is of the well-known construction as is used commonly in the art in the manufacture of twin frozen stick confections composed of an edible substance, such as water ice of some particular flavor. Said twin mold 1 is rectangular in shape and includes an upper flange portion 2, and an intermediate transverse web member 3. A series of open top individual twin mold pockets 4 depend from the web member 3 and are in integral relationship therewith. Each twin mold pocket 4 is comprised of two portions 5, each of which have the general appearance of a cylinder, or a polygonal-sided figure of similar appearance, which are joined by a connecting reduced portion 6 to form a unitary structure.

Each of the twin mold pockets 4 is of the same volumetric capacity, say, four fluid ounces. The twin mold 1 and the twin mold individual pockets 4 usually are made of sheet copper, with the mold and pockets completely tinned after fabrication of the complete mold. Of course, the mold and pockets may be made of any desired materials and formed in any desired manner.

Assuming that each individual twin mold pocket 4 has a volumetric capacity of four fluid ounces, and that a cake center, indicated at 7, displaces approximately one and one-quarter fluid ounces; the first step in my improved process is to fill each of the individual twin mold pockets 4 with the desired volume of a liquid mixture 10 of which the piece is to be formed, say, ice cream mixture of some particular flavor. The individual twin mold pockets 4 may be filled by means of a filling machine of the type well known in the art and which will deliver accurately a fixed volume of a liquid mixture, say, two and three-quarters fluid ounces, through each nozzle positioned to discharge the liquid mixture into each individual twin mold pocket. Of course, the individual twin mold pockets 4 may be filled in any other manner, such as by pouring into the twin mold 1 the aggregate volume of liquid ice cream mixture 10 required to fill each of the individual twin mold pockets 4 to the desired extent, and then using a squeegee to distribute equally the liquid mixture 10 in each individual twin mold pocket 4. The individual twin mold pockets 4 may be filled in any other desired manner, such as by filling the interior of the twin mold 1 with the liquid ice cream mixture 10 to a line above the upper level of the individual mold pockets 4, and then removing the excess liquid mixture 10 to the extent desired by means of a regulator pump.

After each of the individual mold pockets 4 is filled with liquid mixture 10, as aforesaid, a cake center 7 is pushed into each individual mold pocket 4 until the cake center 7 is entirely within its mold pocket 4, as best indicated in Fig. III. As best shown in Fig. VII, the cake center 7 is of less thickness than the shortest distance between the inner walls of the connecting reduced portion 6. The cylindrical-like portions 5 and the connecting reduced portions 6 taper slightly, say, three thirty-seconds of an inch, from the top of each individual twin mold pocket 4 to the bottom thereof. The cake center 7 is of such thickness that it will fit snugly between the reduced portions 6 at the bottom of the individual twin mold pocket 4.

Although I have found it to be preferable to only fill the individual twin mold pockets 4 to the extent described above before the cake centers 7 are inserted in the individual twin mold pockets 4; it is to be understood that the individual twin mold pockets 4 may be filled completely; the cake centers 7 them inserted; and the liquid mixture 10 displaced by the cake centers 7 removed from the twin mold 1 by any desirable means, such as by said regulator pump means referred to above.

The cake center 7 may be made of any desired edible substance which has a sufficient body strength to withstand the push necessary to insert the cake center 7 into the twin mold pocket 4 between the opposite sides of the connecting reduced portion 6. It is preferable that the cake center 7 be as resistant to moisture as is possible. I have found that a cake center made of ingredients similar to that used in making graham wafers is very satisfactory, although, of course, the cake center 7 may be made of any desirable edible substance as stated above. I have found that when the cake centers 7 are coated with an edible vegetable oil of a high melting point, say, 110° Fahrenheit, the cake centers 7 do not become soggy, and remain crisp and fresh under prolonged refrigeration, either in the hardening room of the manufacturer or in the dispensing cabinets of a dealer, after the piece has been completely frozen by immersing the twin mold 1 in a brine tank for a time sufficiently long to completely freeze the liquid ice cream mix 10 in the manner well known and practiced in the art.

I have found that it is preferable to coat the cake center 7 with but a vapor deposit layer of the liquid edible vegetable oil. The cake centers may be coated with the desired thin layer of vapor-deposited edible vegetable oil by means of an enrober equipped with a spray nozzle which has been adjusted to coat graham wafer cake centers of an approximate size of 3⅜″ x 2¼″ x $\frac{7}{32}$″ with the consumption of one pound of the edible vegetable oil per 350 cake center pieces of the aforesaid dimensions.

When the cake centers 7 have been inserted in the individual twin mold pockets 4 in the manner indicated in Fig. III, a stick 12 may be inserted in the liquid mixture 10 in each cylindrical-like portion 5 by means of any well-known stick holder devices (not shown) as are commonly used in the art. The sticks 12, conveniently, are inserted so that they are in engaging contact, or approximate engaging contact, with one side of a cake center 7, as is best shown in Fig. VII.

The twin mold 1 is then subjected to the freezing action of the freezing medium for a period of time sufficient to entirely freeze the ice cream mix 10 to solid form, as indicated at 15. When the frozen stick confection has been completely frozen to the desired degree of hardness, the twin mold 1 is removed from the freezing medium, and the twin mold 1 is defrosted in the manner well known in the art, and the cake center twin frozen stick confections, indicated in Figs. VI and V, dumped from the twin mold 1.

After removal from the twin mold, the cake center twin frozen stick confections may be coated with an outside coating of an edible substance, such as a chocolate coating, in the manner well known in the art.

Although I have described my improved process with reference to its use in forming cake center twin frozen stick confections, it is to be understood that the inclusion of a stick in the piece is not essential in my improved process. Of course, cake center twin frozen confections which do not include a stick, or handle, may be made as readily by the use of my improved process. Although I have described my improved process with reference to the making of a frozen stick confection composed of an ice cream mixture, it is obvious that the piece may be composed of any desirable frozen edible substance.

Therefore, it is obvious that various modifications may be made in my improved process without departing from the essential features thereof, and I do not desire to limit myself to the precise details of the process as herein described.

I claim:

1. The method of molding a cake center twin frozen confection, consisting in partially filling the individual twin mold pockets of a twin mold of ordinary construction with a liquid mixture; inserting a cake center coated with a thin vapor-deposited layer of an edible vegetable oil in said partially liquid mixture filled individual twin mold pockets, said cake center being inserted between the inner walls of the narrow connecting portion between the two cylindrical-like portions of the individual twin mold pocket; pressing said cake centers toward the bottom of said individual twin mold pockets until said cake centers are entirely within the individual twin mold pockets; removing from said twin mold the excess of said liquid mixture displaced by the insertion of said cake centers entirely within their respective individual twin mold pockets; subjecting said twin mold to the freezing action of a freezing medium for a period of time sufficiently long to freeze said liquid mixture to the desired degree of hardness; and removing the cake center twin frozen confections from said individual twin mold pockets.

2. The method of molding a cake center twin frozen confection, consisting in partially filling the individual twin mold pockets of a twin mold of ordinary construction with a liquid mixture; inserting a cake center coated with a thin vapor-deposited layer of an edible vegetable oil in said partially liquid mixture filled individual twin mold pockets, said cake center being inserted between the inner walls of the narrow connecting portion between the two cylindrical-like portions of the individual twin mold pocket; pressing said cake centers toward the bottom of said individual twin mold pockets until said cake centers are entirely within the individual twin mold pockets; removing from said twin mold the excess of said liquid mixture displaced by the insertion of said cake centers entirely within their respective individual twin mold pockets; inserting a stick into said liquid mixture in each cylindrical-like portion of each individual twin mold pocket; subjecting said twin mold to the freezing action of a freezing medium for a period of time sufficiently long to freeze said liquid mixture to the desired degree of hardness; and removing the cake center twin frozen confections from said individual twin mold pockets.

3. The method of molding a cake center twin frozen confection, consisting in partially filling the individual twin mold pockets of a twin mold of ordinary construction with a liquid mixture; inserting a cake center coated with a thin vapor-deposited layer of an edible vegetable oil in said partially liquid mixture filled individual twin mold pockets, said cake center being inserted between the inner walls of the narrow connecting portion between the two cylindrical-like portions of the individual twin mold pocket; pressing said cake centers toward the bottom of said individual twin mold pockets until said cake centers are entirely within the individual twin mold pockets; removing from said twin mold the excess of said liquid mixture displaced by the insertion of said cake centers entirely within their respective individual twin mold pockets; inserting a stick into said liquid mixture in contact with the surface of the respective cake center in each cylindrical-like portion of each individual twin mold pocket; subjecting said twin mold to the freezing action of a freezing medium for a period of time sufficiently long to freeze liquid mixture to the desired degree of hardness; and removing the cake center twin frozen confections from said individual twin mold pockets.

4. The method of molding a cake center twin frozen confection, consisting in partially filling the individual twin mold pockets of a twin mold of ordinary construction with a liquid mixture; inserting a cake center coated with a thin vapor-deposited layer of an edible vegetable oil having a melting point above ordinary room temperatures in said partially liquid mixture filled individual twin mold pockets, said cake center being inserted between the inner walls of the narrow connecting portion between the two cylindrical-like portions of the individual twin mold pocket; pressing said cake centers toward the bottom of said individual twin mold pockets until said cake centers are entirely within the individual twin mold pockets; removing from said twin mold the excess of said liquid mixture displaced by the insertion of said cake centers entirely within their respective individual twin mold pockets; inserting a stick into said liquid mixture in contact with the surface of the respective cake center in each cylindrical-like portion of each individual twin mold pocket; subjecting said twin mold to the freezing action of a freezing medium for a period of time sufficiently long to freeze said liquid mixture to the desired degree of hardness; and removing the cake center twin frozen confections from said individual twin mold pockets.

5. The process of molding a cake center twin frozen confection, consisting in coating the to-be-used cake centers with a thin vapor-deposited layer of a vegetable oil; inserting one of said cake centers in the partially liquid mixture filled individual pockets of a twin mold of ordinary construction pressing said cake centers toward the bottom of the individual twin mold pockets until said cake centers are entirely within the individual twin mold pockets; subjecting said twin mold to the freezing action of a freezing medium for a period of time sufficiently long to freeze said liquid mixture to the desired degree of hardness; and removing the cake center twin frozen confections from said individual twin mold pockets.

6. A process as in claim 5, wherein the layer of edible vegetable oil has a melting point above ordinary room temperatures.

CLINTON O. LUND.

References Cited in the file of this patent

UNITED STATES PATENTS

| Number | Name | Date |
|---|---|---|
| D. 92,987 | Thomas | Aug. 7, 1934 |
| 1,136,074 | White | Apr. 20, 1915 |
| 1,947,010 | Jones | Feb. 13, 1934 |
| 1,952,101 | Snodgrass | Mar. 27, 1934 |
| 1,968,183 | Vogt | July 31, 1934 |
| 1,980,588 | Hopp | Nov. 13, 1934 |
| 2,123,215 | Thomas | July 12, 1938 |
| 2,248,651 | Von Losberg | July 8, 1941 |
| 2,429,353 | Gibson, Sr. | Oct. 21, 1947 |
| 2,500,006 | Overland | Mar. 7, 1950 |